(12) United States Patent
Marshall

(10) Patent No.: US 6,208,661 B1
(45) Date of Patent: Mar. 27, 2001

(54) VARIABLE RESOLUTION SCHEDULER FOR VIRTUAL CHANNEL COMMUNICATION DEVICES

(75) Inventor: John William Marshall, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/004,089

(22) Filed: Jan. 7, 1998

(51) Int. Cl.⁷ ............................ H04L 12/56
(52) U.S. Cl. ..................... 370/412; 370/230
(58) Field of Search .................. 370/395, 397, 370/412, 466, 311, 229, 218, 352; 709/100

(56) References Cited

U.S. PATENT DOCUMENTS

| | | | |
|---|---|---|---|
| 5,390,184 | 2/1995 | Morris | 370/353 |
| 5,455,825 | 10/1995 | Lauer et al. | 370/413 |
| 5,463,620 * | 10/1995 | Sriram | 370/412 |
| 5,491,691 | 2/1996 | Shtayer et al. | 370/395 |
| 5,497,375 | 3/1996 | Hluchyj et al. | 370/232 |
| 5,499,238 | 3/1996 | Shon | 370/399 |
| 5,515,363 | 5/1996 | Ben-Nun et al. | 370/232 |
| 5,517,495 | 5/1996 | Lund et al. | 370/399 |
| 5,533,020 | 7/1996 | Byrn et al. | 370/395 |
| 5,570,355 * | 10/1996 | Dail et al. | 370/352 |
| 5,818,815 * | 10/1998 | Carpentier et al. | 370/218 |
| 5,835,494 * | 11/1998 | Hughes et al. | 370/397 |
| 5,859,835 * | 1/1999 | Varma et al. | 370/229 |
| 5,995,995 * | 11/1999 | Thomas et al. | 709/100 |
| 6,011,798 * | 1/2000 | McAlpine | 370/395 |
| 6,018,527 * | 1/2000 | Yin et al. | 370/412 |
| 6,072,784 * | 6/2000 | Agrawal et al. | 370/311 |

* cited by examiner

Primary Examiner—Hassan Kizou
Assistant Examiner—John Pezzlo
(74) Attorney, Agent, or Firm—Gerald R. Woods; Myers Bigel Sibley & Sajovec, P.A.

(57) ABSTRACT

The present invention provide for scheduling protocol data units for transmission on a virtual channel. The scheduling is accomplished by first determining a relative theoretical departure time for a protocol data unit. Departure times are identified in each of a plurality of time domains based upon the relative theoretical departure time for the protocol data unit. An identified departure times is selected from a time domain and the protocol data unit is scheduled for transmission during the selected available departure time.

29 Claims, 7 Drawing Sheets

VARIABLE RESOLUTION SCHEDULER FOR VIRTUAL CHANNEL COMMUNICATION DEVICES

FIELD OF THE INVENTION

The present invention relates to a method and apparatus for scheduling the transmission of cells from a number of data streams over a common communications link.

BACKGROUND OF THE INVENTION

In a packet based communication network which supports the simultaneous flow of multiple virtual channels (VC) through each physical communication link, packets or cells (cells are fixed size packets) belonging to different virtual channels will be interleaved as they are transmitted onto the communication link. Whether the origin of the packets or cells is at an end-station directly connected to a communication link or from a switch which is multiplexing multiple incoming links to the same outgoing link, the scheduling of packets or cells onto the outgoing link must be performed in such a way so as to satisfy the negotiated quality of service (QOS) of the virtual channels (VC's) to which they pertain. One example of the type of network described above is the Asynchronous Transfer Mode (ATM) ("Asynchronous Transfer Mode: Solution for Broadband ISDN", M de Prycker, Ellis Horwood, 1991) the internationally agreed upon technique for transmission, multiplexing, and switching in a broadband network. ATM uses fixed size cells as a unit of transmission.

ATM networks are designed to support the integration of high quality voice, video, and high speed data traffic. To the end-user, it promises to provide the ability to transport connection-oriented and connectionless traffic at constant or variable bit rates. It enables the allocation of bandwidth on demand and provides a negotiated Quality-of-Service (QOS). To a network provider, ATM enables the transport of different traffic types through the same network. In order for a network to meet QOS requirements as set by the user for a session, the network must have sufficient information about the traffic characteristics of the session. This may be approximated by (but not limited to) three basic parameters: 1) average transmission rate, 2) peak transmission rate and 3) the interval over which the data may be transmitted at peak rate.

As a part of the QOS contract with network, all sessions must abide by the traffic parameters and not violate these parameters in order for the network to guarantee QOS to all the users. This gives rise to a complex scheduling problem when many sessions are established over a network link, which requires that each session's contract with the network not be violated. At the same time, all sessions must get the desired capacity from the network. This problem is fairly complex particularly when a large number of sessions with a wide range of traffic descriptors are involved. The problem is compounded when different sessions require a different QoS. Therefore, in case of contention, where a multiplicity of sessions have data to be transmitted and their individual contracts with the network will allow them to transmit, sessions requiring stricter QOS guarantee must be given priority over other sessions.

The development of ATM has increased the need to develop methods to efficiently and fairly multiplex multiple virtual channels onto a single physical media. Traffic flow patterns are variable within quality of service contract parameters on a per channel basis. Multiple levels of priority have been defined to differentiate groups of virtual channels. However, scheduling conflicts are likely to occur when aggregating like priority virtual channels since high hardware physical media utilization is required. Schedulers are required to operate in real time and are traditionally memory intensive when channel conflicts occur.

Traditional network scheduling techniques (e.g., Token Ring) (Token Ring Access Method and Physical Layer Specifications, IEEE, 1985) and Ethernet (The Ethernet: A Local Area Network: Data Link Layer and Physical Layer Specifications, Version 2.0, Digital Equipment Corporation, Intel, Xerox, 1982) have a fairly simple notion of traffic. These network scheduling techniques are based on best effort transmission schemes, whereby each user may obtain a fair share of the network bandwidth. There is no pre-negotiated traffic descriptor or Quality-of-Service (QOS) requirements. Users obtain as much of a share of the network bandwidth as possible, and network scheduling distributes the bandwidth fairly between them. The above scheduling techniques are relatively simple and well known (e.g., hierarchical round robin or static priority scheduling). When the network provides a transmission opportunity (e.g., by means of a token in a Token Ring network) to a user, the user will transmit data based on a first-come first-serve policy.

The FDDI Standard (ANSI Standard, "FDDI SMT", ANSI X3T9.5) introduced the notion of negotiated bandwidth wherein the user requests bandwidth by means of specifying only one rate (peak rate) requirement and the network controls when that user may be able to transmit. There is no notion of average rate or burst length. In all these examples of known systems, the networks regulate transmission opportunities based on a simple fairness algorithm.

Due to the large number of virtual channels that may be simultaneously active on an ATM link, the set of active virtual channel contexts may be stored in external memory banks. Memory access bandwidth requirements translate into the need for some number of external memory banks that are physically connected to a VLSI module. The number of input/output pins available to a VLSI module is a scarce commodity and will ultimately limit the aggregation function's ability to scale for high bandwidth ATM applications.

Some systems address the scheduling problem by implementing a finite set of hardware timers dedicated to operate on groups of channels with similar quality of service objectives. This grouping reduces the number of scheduling conflicts by establishing a predefined order within each set of channels. The set of possible scheduling conflicts is reduced to the set of conflicts arising from simultaneous timer events. Such systems have a number of limitations. First, to reduce timer conflicts relatively few timers are used and, consequently, the granularity of the quality of service is course as compared to the set of rates defined by the ATM standard. Second, when timer conflicts occur, the resolution of channel conflicts will be sub-optimal on a per channel basis due to the generalization applied to form timer sets.

SUMMARY OF THE INVENTION

In view of the above discussion, it is an object of the present invention to provide for more efficient scheduling of data transmission over a network.

It is another object of the present invention to account for individual QoS requirements of virtual channels in scheduling protocol data units from the virtual channels.

It is another object of the present invention to provide scheduling service to multiple virtual channels in a fair manner over variations in bandwidth.

It is another object of the present invention to provide scheduling service to multiple controllers.

It is still another object of the present invention to provide a scheduling mechanism which requires less memory bandwidth.

It is yet another object of the present invention to provide a scheduling mechanism that may be implemented efficiently in hardware.

These and other objects are provided by methods, systems and computer program products for scheduling protocol data units for transmission on a virtual channel. The scheduling is accomplished by first determining a relative theoretical departure time for a protocol data unit. Departure times are identified in each of a plurality of time domains based upon the relative theoretical departure time for the protocol data unit. An identified departure time is selected from a time domain and the protocol data unit is scheduled for transmission during the selected available departure time.

The present invention provides a more efficient scheduling service by storing limited context information concerning the virtual channels to be scheduled. Specifically, the present invention provides a storage means for only unreserved departure times within each time domain wherein the storage means stores context information concerning the virtual channels to be scheduled. The present invention avoids the use of hardware timers to represent the QoS objectives for particular channels. The hardware timers may be coarse in approximating the rates in the ATM standard, thus limiting the number of virtual channels on a physical link. The present invention may use multiple time domains with varied porosity which may provide a scheduling service which becomes finer as the requested schedule time approaches the immediate time domain.

The present invention may provide a fair scheduling service by reserving departure times in time domains greater than the immediate time domain which become available departure times within the time domains. Specifically, the present invention identifies available departure times in each of the time domains by comparing the relative theoretical departure time of a protocol data unit to the range of departure times corresponding to each of the plurality of time domains to identify time domains corresponding to the relative theoretical departure time of the protocol data unit. The invention then identifies as available an unused departure time in an identified time domain. The unused departure time may be identified by determining if an unreserved and unused departure time exists in an identified time domain if the identified time domain is later than an immediate time domain and determining if an unused departure time exists in the immediate time domain if the immediate time domain is an identified time domain.

Fairness may be maintained by inserting unreserved and unused departure times within some time domains over time, not solely into the last time domain. Fairness is provided among virtual channels having differing bandwidths and Protocol Data Unit PDU (i.e., data) variation requirements by controlling the insertion point of unreserved and unused. Because scheduling is based on a virtual channel's inter PDU interval, virtual channels having low data rates are scheduled in time domains toward the end of the overall scheduling interval and spend more time in waiting for transmission than channels having a high data rate that are departure times near relative time 0. If no provision is made to provide unreserved and unused departure times for faster channels, the slower channels may tend to starve the higher rate channels by blocking desired departure times.

The present invention provides insertion of unreserved and unused positions at the boundary of each time domain where there is a change in the time domain's porosity.

The present invention may also provide fairness by determining a relative theoretical departure time for a protocol data unit, wherein the protocol data unit originates from one of a plurality of virtual channels each having similar priority. Specifically, the present invention may provide the ability to make scheduling decisions based on the channel's sensitivity to PDU variation. This sensitivity is represented by the choice of time domain porosity values. PDU variations are generally expressed as a multiple of the channel's inter PDU interval where most channel requirements range from two times the PDU interval to four and one half times the PDU interval. Consequently, low bandwidth channels have a greater degree of scheduling freedom than higher bandwidth channels. This property can be exploited when a scheduling conflict occurs. To reduce the likelihood of clumping occurring in low bandwidth channels that can restrict the scheduler's ability to resolve higher bandwidth requests, a variable spacing mechanism is provided to resolve low bandwidth channel conflicts. Spacing occurs in time domains having a porosity less than one. Spacing may cause some number of adjacent transmissions to be reserved and thereby excluded from the set of possible scheduling solutions. Spacing may have the effect of creating a more uniform distribution of unreserved and unused departure times as seen by time domains having higher porosity. This distribution statistically may increase the system's ability to successfully resolve all scheduling requests. The domain's spacing interval is the reciprocal of the domain's porosity.

The present invention may also maintain a fair distribution of bandwidth in cases where the total bandwidth requested by the set of controllers exceeds the available transmission rate. This property may be important in multi-priority systems since the available bandwidth for lower priority classes may vary dynamically over time. The invention's fairness may uniformly scale within an individual channel's bandwidth without requiring modification of individual control parameters.

The present invention may also provide a more efficient scheduling service by comparing the relative theoretical departure times to the range of departure times and identifying as available an unused departure time in an identified time domain substantially simultaneously. Specifically a parallel approach to scheduling may be used. Scheduling time is a function of the physical size of each time domain, not the total interval. This property allows for the design of a scaleable system since scheduling time is decoupled from the total supported scheduling interval wherein the scheduling interval may represent all possible entries.

The present invention may also reduce the memory bandwidth required to schedule a large number of virtual channels by only providing storage for context information for unreserved departure times. Furthermore, a reduction in the memory bandwidth requirement may result in fewer input/output pins in a system implemented using VLSI package.

The present invention allows multiple controllers to utilize the scheduler thus providing a common interface. Specifically, certain embodiments of the present invention define a Relative Theoretical Departure Time as a request for a departure time for a PDU on a certain virtual channel, a Best Available Departure Time which offers the requesting controller a departure time, an Accept Best Available Departure Time for accepting the offered departure time, a Relative Maximum Departure Time as a last possible time for scheduling the PDU on a certain virtual channel, and an Actual Departure Time which represents the departure time in which the PDU was transmitted. If the controller adheres to the above uniform interface, it may use the scheduler.

The present invention may also allow multiple controllers to utilize a scheduler by resolving substantially simultaneous requests for the same departure time from different controllers by providing a Relative Maximum Departure Time for each request which indicates the latest departure time allowed by each controller for the corresponding request.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 4A:
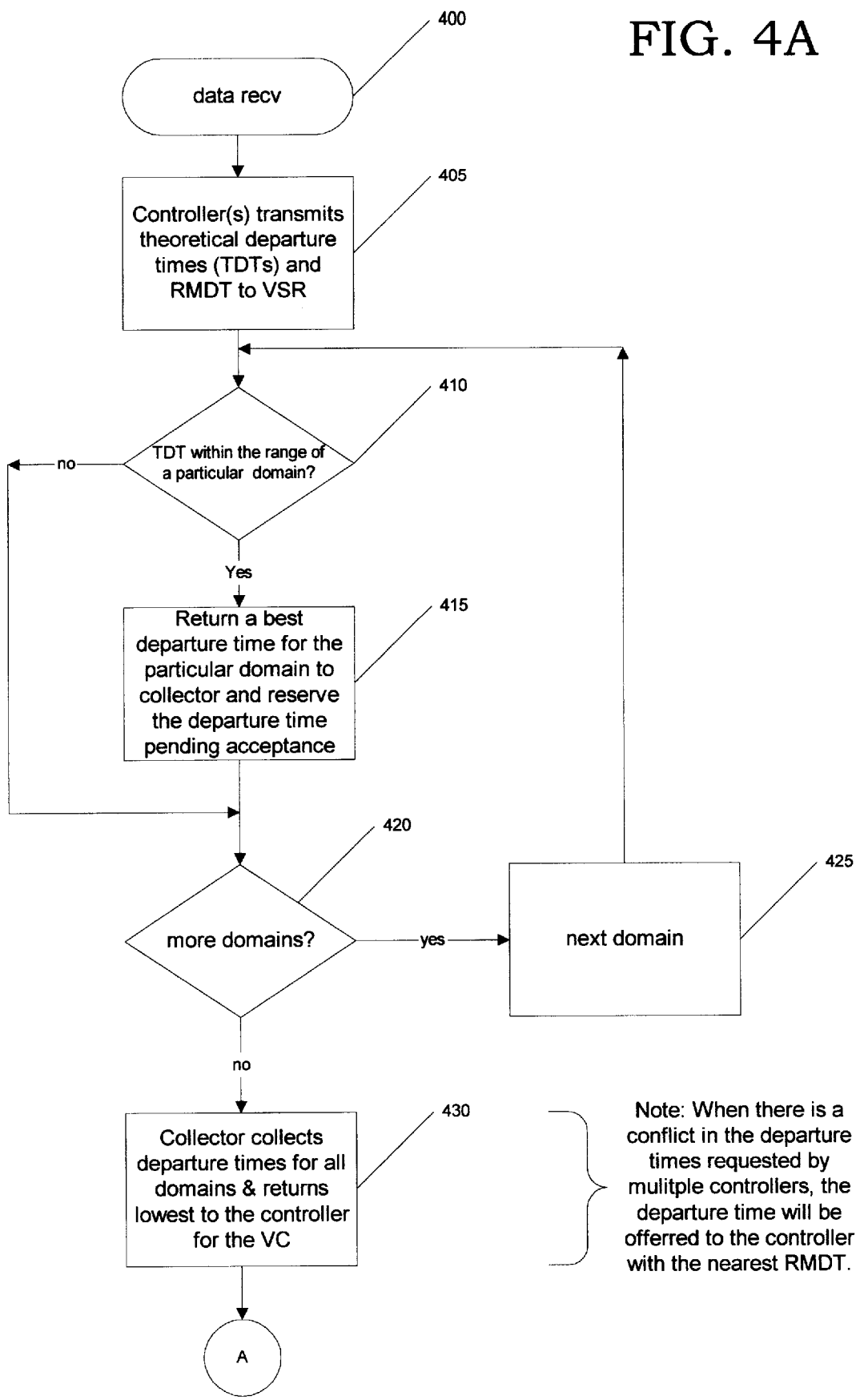
FIGS. 4A–4B is a flow chart of the operation of a system utilizing the present invention.
Figure 4B:
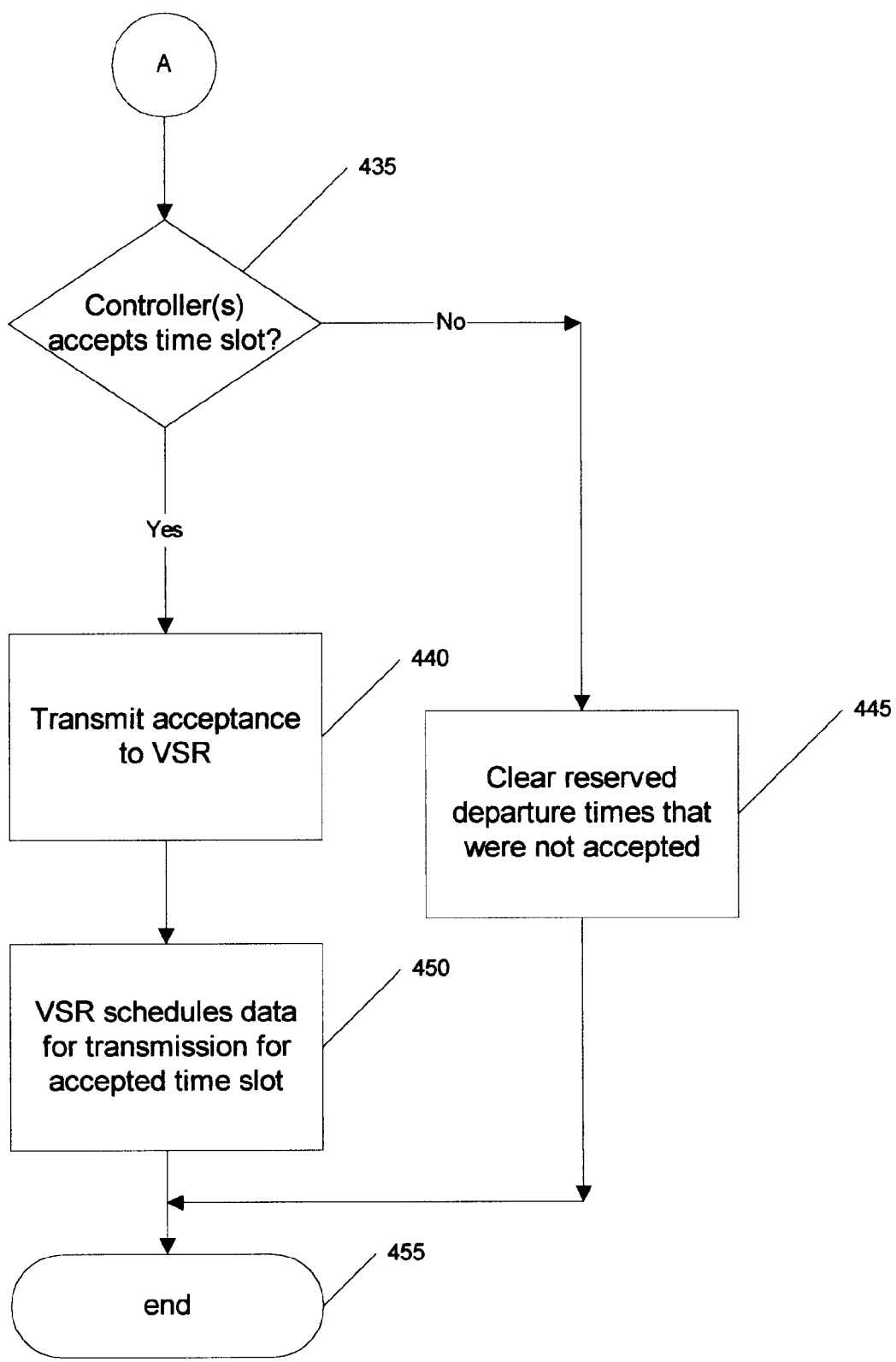

The present invention is also described with respect to FIGS. 4A and 4B which are flowchart illustrations of one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
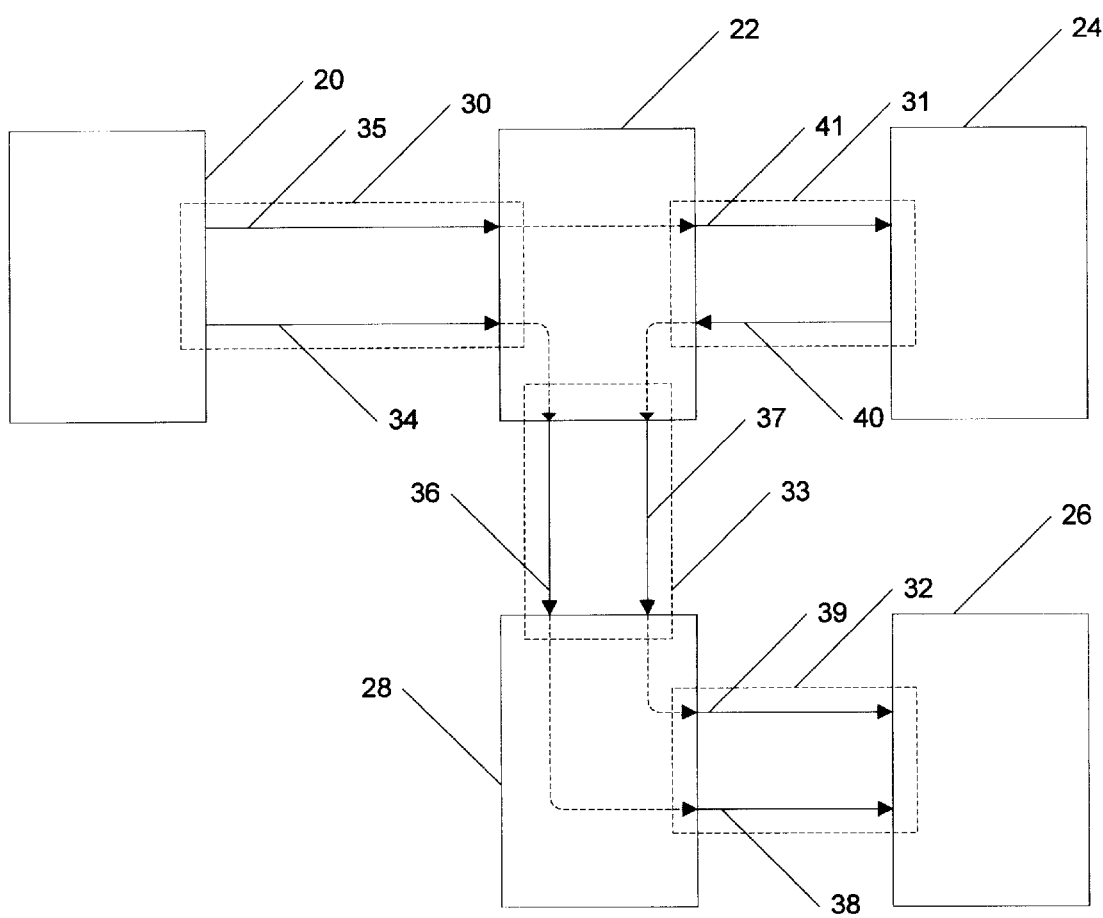
FIG. 1 illustrates a network using ATM.

FIG. 1 illustrates a network utilizing Asynchronous Transfer Mode (ATM) according to the present invention. As seen in FIG. 1, a number of ATM nodes 20, 22, 24, 26 and 28, are interconnected via physical links 30, 31, 32 and 33. The physical links provide for communication between the nodes and allow for the interconnection of ATM nodes by multiple virtual virtual channels to provide paths from one node to another. The virtual channels in FIG. 1 are illustrated as connections 34, 35, 36, 37, 38, 39, 40 and 41.

As an example of a path between nodes 20 and 26, node 20 may make a virtual channel to node 26 utilizing virtual channel 34 over physical link 30 which connects node 20 to node 22. Node 22 then connects to node 28 utilizing virtual channel 36 over physical link 33. Node 28 then utilizes virtual channel 38 over physical link 32 to connect to node 26. The route of virtual channel 34 to virtual channel 36 to virtual channel 38 will then be utilized as the connection from node 20 to node 26 for all cells for the requested connection.

As will be appreciated by those of skill in the art, the nodes of FIG. 1 may be ATM endpoint nodes, ATM switches, user network interface nodes or other processing systems utilizing the ATM communication protocols. Thus, the present invention is not limited to use in ATM switches but may be utilized in any devices complying with ATM standards.

When a request by a user to access the ATM network of FIG. 1 is made, for example, to node 20, the node evaluates whether the QoS parameters of the request may be met by a route through the ATM network before the connection request is accepted. Thus, for example, if a request is made for a connection between node 20 and node 24, node 20 would evaluate the status of connections at node 20, node 22, and node 24 to determine whether to accept the request. Thus, node 20 must have information regarding the connections which already exist through node 22 and node 24. The node 20 will then determine whether the request may be accepted. If the request is accepted the connection between node 20 and node 24 is established. Moreover, this process may be repeated to establish multiple virtual channels between node 20 and node 24.

Conflicts can occur when multiple virtual channels simultaneously request a data transfer. The conflict results from the limited bandwidth available for transmitting data. One way to reduce the effect of conflicts is to schedule data transfers according to the service associated with the conflicting VCs. Each established VC has an associated Quality of Service (QoS) parameter which indicates the level of service which, by prior agreement with the end user, must be maintained by the network. In other words, the scheduler may examine the QoS associated with the two conflicting VCs and decide which data transfer may be delayed and which virtual channel may be transmitted.

Figure 2:
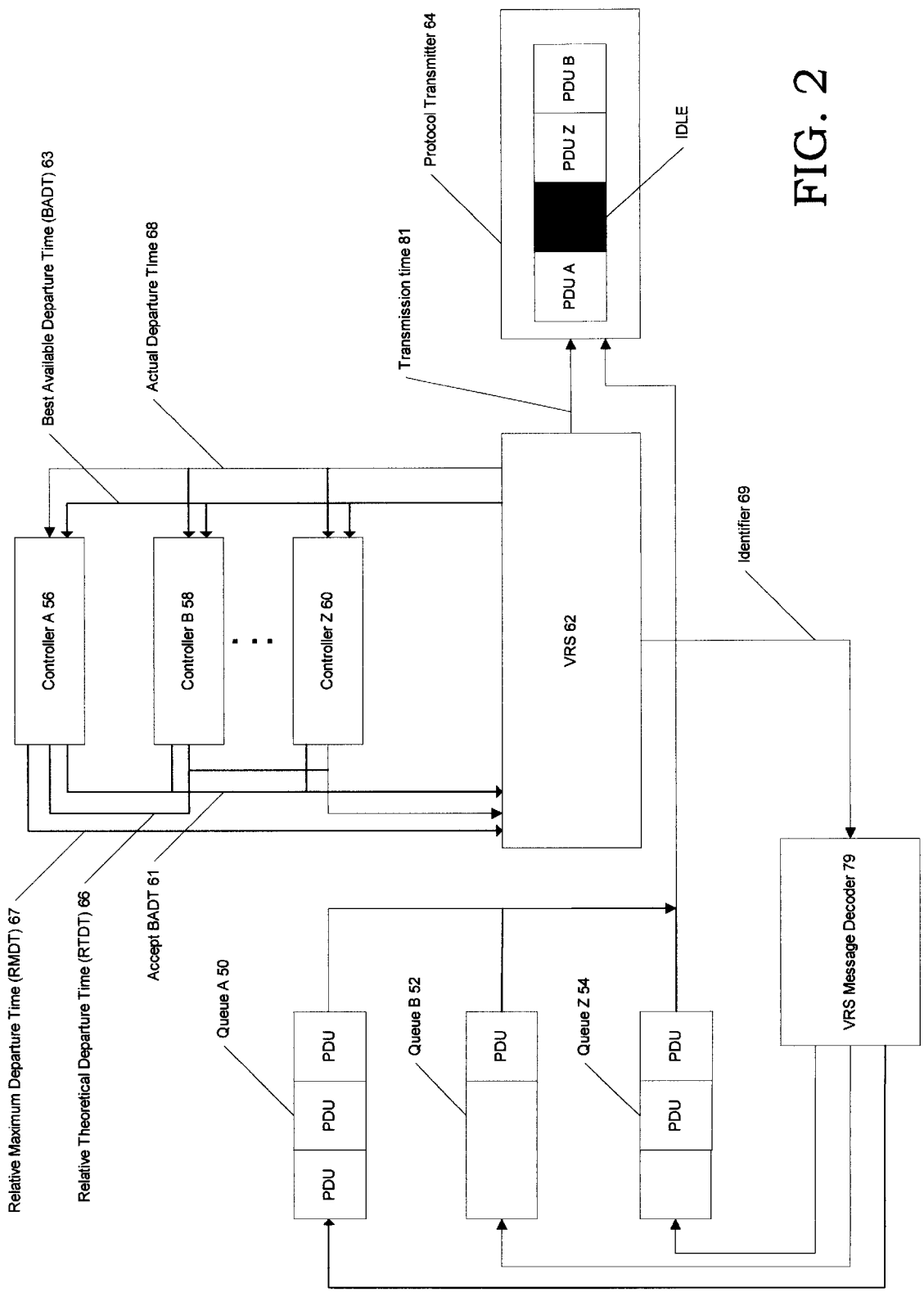
FIG. 2 is a block diagram of a system utilizing the present invention to schedule data transmission during intervals over a series of virtual channels at a node within a network.

FIG. 2 illustrates a system utilizing the present invention to schedule data transmission during intervals over a series of virtual channels at a node within a network. Protocol Data Units (PDUs) arrive at the node via Virtual Channel A (VC A), Virtual Channel B (VC B), and Virtual Channel Z (VC Z) and are placed in a corresponding Queue A 50, Queue B 52, or Queue Z 54. The amount of data represented by a PDU may vary over a wide range of sizes. Each queue has a corresponding controller which is responsible for maintaining the QoS for the associated virtual channel. For example, Controller A 56 processes queue A 50, Controller B 58 processes queue B 52, and Controller Z 60 processes Queue Z 54.

The controller requests a Relative Theoretical Departure Time (RTDT) 66 for a PDU within the assigned queue and specifies a Relative Maximum Departure Time (RMDT) 67. The RTDT 66 indicates the transmission time for a PDU within the controller's assigned queue. For example, the RTDT 66 may request a transmission at departure time 1 (i.e., the first departure time within time domain 0) or some later departure time (e.g., interval 40). If the RTDT 66 contains a fraction, the RTDT 66 is rounded up to the nearest integer. The RMDT 67 indicates the latest time at which the PDU may be transmitted while maintaining the QoS for that VC. The controller may also accept feedback indicating the Actual Departure Time (ADT) 68 of a PDU from the controller's assigned Queue so as to monitor compliance with the QoS for that VC. A negative acknowledgment will be received if the request cannot be accommodated at that time.

The Variable Resolution Scheduler (VRS) 62 indicates which VC will be serviced during each of the intervals or departure times by recording its Virtual Channel Identifier (VCI). The VCI uniquely identifies where to find information pertaining to the channel's context. A typical channel context may contain information pertaining to queuing, scheduling, and other state information. The VRS 62 determines the best available time for each request by examining the status of each interval scheduled by the VRS 62. The requested departure time may be reserved, unavailable or available. Reserved status means that the VSR 62 will not offer that particular departure time to a Controller (i.e., the interval may not be scheduled at that time). Unavailable status means that the VSR 62 has already allocated that particular departure time to a controller. Available status means that the VRS 62 may offer that particular departure time to a Controller. If the requested departure time is identified as available it may be offered to the controller which made the request. If the requested departure time is reserved or unavailable, the VRS 62 will determine if another interval is available. If so, that departure time may be offered to the controller. If the controller decides to use the offered departure time, the controller sends an acceptance or acknowledgment to the VRS 62.

The VRS 62 reserves certain departure times from being scheduled to provide a fair scheduling between all VCs requesting service. Reserving a portion of the departure times provides for a number of departure times to be available over time, thereby providing a fair distribution of available departure times to all VCs requesting service. Otherwise, a long continuous run of departure times might be scheduled and cause some VCs to be starved of departure times. In a system utilizing certain embodiments of the present invention, the reserved departure times may be identified as available so that a later request may be met. For example, a set of departure times may be initially reserved. As time passes the reserved departure times advance with the transmission of each PDU. When the reserved departure times advance such that the reserved departure times are close to the present transmission time, the reserved departure times may be made unreserved and unused. In this way, a request for a near term interval may be met. Alternatively, if intervals 1 through 40 were either reserved or used, a request for interval 5 may result in a best available time of interval 41. Consequently, the QoS corresponding to the VC requesting interval 5 may be violated. If no departure times are available, the controller may delete the PDU from the queue. If the porosity of a scheduling domain is less than 1, the controller could reject position 41 and resubmit the request the following internal time.

Fairness among virtual channels is defined by a correlation factor that relates the ratio of a channel's requested bandwidth to the delivered bandwidth over multiple virtual channels. Fairness measurements can be made using many different virtual channel bandwidth distribution models. Although there are many possible scenarios, the fair system divides the total available bandwidth uniformly without giving preference to a certain set of virtual channels. Consequently, the VRS 62 is intended to operate within a single priority class. Priority based system schedules are expected to favor high priority channels. When used in a multi-priority system, multiple instances of the VRS 62 would be used.

If more than one controller requests the same RTDT 66, The VRS 62 may use the RMDT 67 to resolve the conflict. The VRS 62 offers the departure time selected within the earliest identified time domain to the controller with the earliest RMDT 67. The controller may accept or reject the offered time. If the controller accepts the offered departure time, the VRS 62 designates accepted time as used. When the time for transmission of the particular PDU arrives, the corresponding PDU is transmitted by the Protocol Transmitter 64.

The VRS 62 transmits its contents to the Protocol Transmitter 64 each cycle. The Protocol Transmitter 64 transmits the PDU corresponding to the VCI received from the VRS 62 to the physical media.

The VRS 62 also transmits an Identifier 69 to the VRS Message Decoder 79. The Identifier 69 may be accompanied by a dequeue command which instructs the VRS Message Decoder 79 to remove a PDU from the queue indicated by the Identifier 69.

The proper PDU is then transmitted to the Protocol Transmitter 64 from the indicated queue. The PDU is transmitted by the Protocol Transmitter 64 when a Transmission time 81 from the VRS 62 corresponding to the next transmission time.

During transmission, memory is used (external or internal memory banks). The VRS 62 stores unique identifiers. Only the PDUs are stored in VC queues. The VRS 62 sends a dequeue message to the appropriate queue. The queue is responsible for actual data movement.

Figure 3:
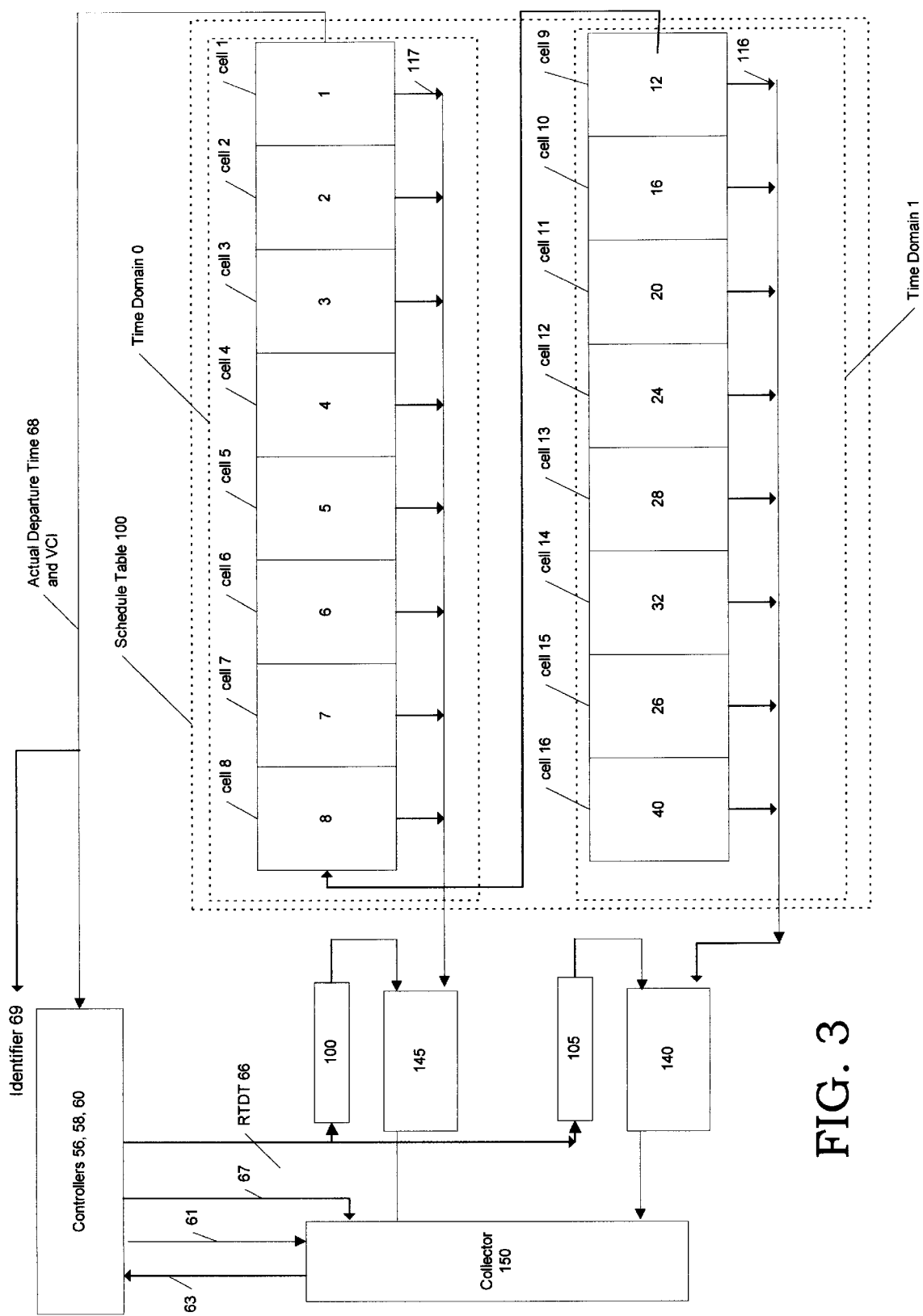
FIG. 3 is a block diagram of a Variable Resolution Scheduler.

Referring now to FIG. 3, the VRS 62 will be described in greater detail. The VRS 62 accepts requests for RTDTs 66 and RMDT 67 from the controllers and offers a Best Available Departure Time (BADT) 63 based on the status of the requested departure time as recorded in the VSR 62. If the controller accepts the BADT 63 the controller transmits the Accept BADT 61 to the VRS 62. The VRS then designates the offered departure time as used. When a particular PDU's departure time arrives, the corresponding VCI is transmitted to the Protocol Transmitter 64 and the Actual Departure Time 68 is transmitted to the controller which made the intial request.

The VRS 62 uses a Scheduling Table 100 to record the status (i.e., reserved, available or unavailable) of all departure times for PDUs. The scheduling table 100 is organized as cell 1 through 16 according to the relative timing of the departure times. The cells 1, 2, 3, 4, 5, 6, 7, and 8 contain information identifying which PDU will be transmitted during the corresponding departure time. For example, the cell 1 contains the VCI identifying which PDU will be transmitted in the departure time 1. The cell 2 contains information identifying which PDU will be transmitted at departure time 2. The cells 9, 10, 11, 12, 13, 14, 15, 16, 17, 18, 19, and 20 contain the VCI identifying which PDU will be transmitted during the corresponding departure time. For example, the cell 9 may identify which PDU is to be transmitted during departure time 9.

Although the Scheduling Table 100 shown in FIG. 3 includes 40 departure times, it should be understood that the Scheduling Table 100 may include a wide range of departure times for scheduling. The Scheduling Table 100 may be implemented using a parallel loadable shift register. In this embodiment, cells within the Scheduling Table 100 would be represented by the individual bits within the shift register. Furthermore, when a departure time is allocated to a certain virtual channel, the information necessary to identify the PDU is loaded into the corresponding bits within the shift register. The porosity of the individual time domains may be provided by shifting the elements of the shift register which makes up the corresponding time domain with a clock signal which is an integer multiple of the clock signals used to shift the other time domains within the Scheduling Table 100.

The size of the scheduling interval is dictated by the minimum necessary channel bandwidth and allowable transmission variation. In one embodiment, the VRS 62 is used with an open loop controller, the relative theoretical departure time presented to the VRS 62 is a constant representing the inter PDU interval. The inter PDU interval is the inverse of the channel's bandwidth. Thus scheduling low bandwidth channels implies a larger PDU interval that defines the upper bound of the scheduling interval.

The departure times described above may be logically grouped into time domains wherein the immediate time domain or time domain 0 represents a range of near term departure times and time domain 1 represents longer term departure times. For example, for a system with 40 departure times, departure times 1 through 8 may be placed in time domain 0 and departure times 9 though 40 may be placed in time domain 1. Moreover, some departure times within a particular time domain may be reserved. For example, one fourth of the departure times in time domain 1 may be reserved from scheduling. Therefore cells 9, 10, 11, 12, 13, 14, 15, 16, 17, 18, 19, and 20 may represent departure times 9 through 40 wherein each cell represents an available departure time within time domain 1.

The reserved departure times might not be directly represented by physical cells with the VSR 62. Accordingly, each cell within time domain 1 may represent four departure times: one of the four departure times is unreserved and unused while the other three departure times are reserved. The unreserved departure times may be either used or unused, depending on whether the particular departure time has been scheduled. For example, cell 9 may represent departure times 9, 10, 11, and 12 wherein departure times 9, 10, and 11 are reserved and departure time 12 is available. The ratio of unreserved departure times to the total number of departure times within a time domain is referred to as the porosity of the time domain. For example, FIG. 3 shows time domain 0 with a porosity of 1 (i.e., no departure times reserved) whereas time domain 1 is shown with a porosity of 0.25 (i.e., three of every four departure times reserved). While the present invention has been described with respect to 2 time domains, as will be appreciated by one of skill in the art, the present invention may utilize any number of differing departure time domains.

All of the information recorded in the VRS 62 is shifted to represent the passage of time. A shift has the effect of shifting all VCIs one position closer to the end of its time domain and ultimately to its transmission time. When a VCI is shifted out of one time domain, it is shifted into another. As the VCIs are shifted over time, the VCIs travel from one time domain to another until reaching the end of the VRS 62 corresponding to departure time 1 when the particular VCI is transmitted. When a particular VCI reaches the end of the VSR, the Protocol Transmitter 64 is signaled to transmit the corresponding PDU.

The frequency with which the individual cells within a certain time domain are shifted depends on the porosity of the corresponding time domain. For example, all cells within a time domain with a porosity of 1 will be shifted when a PDU is transmitted. All cells within a time domain with a porosity of 0.25 will be shifted once for every four PDUs transmitted. For example, cells 1 through 8 in FIG. 3 will be shifted with a porosity of 1 (i.e., every time a PDU is transmitted). The cells 9 though 20 in time domain 1 in FIG. 3 will be shifted once for every four PDUs transmitted. This has the effect of inserting available departure times at the boundary of time domain 1 and 0. For example, cell 9 will be shifted once for every four PDUs which are transmitted. Because cell 9 represents departure times 9, 10, 11, and 12 three available departure times (i.e., 9, 10, and 11) will be shifted into time domain 0 before cell 9 is shifted into time domain 0. Moreover, the porosity of each time domain is related to the porosity of all other time domains. Each time domain should be shifted with a frequency that is an integer multiple of the adjacent time domains to ensure the proper transition of departure times at the boundary between adjacent time domains.

The RTDT 66 is received by the comparator 100 and the comparator 105. The comparator 100 identifies as available, time domains within the VSR 62. Specifically, the comparator 100 and 105 use the RTDT 66 to compare the relative theoretical departure time of the protocol data unit to the range of departure times corresponding to each of the plurality of time domains to identify time domains corresponding to the relative theoretical departure time of the protocol data unit. Furthermore, the comparator 100 uses the RTDT 66 to generate a mask to identify as available an unused departure time in an identified time domain. The mask prevents any departure time which is less than the RTDT 66 from being used to schedule the transmission of the PDU corresponding to the RTDT 66. For example, if the RTDT 66 is equal to departure time 3, the status of departure times 2 and 1 will not be examined for availability. All departure times that are greater than or equal to the RTDT 66 (i.e., 3 or higher) will be examined for availability. The mask is then transmitted to combinatorial logic 145. Each of the departures times within the time domain 0 transmits an indication 117 of its availability to the combinatorial logic 145.

The comparator 105 uses the RTDT 66 to generate a mask which prevents any departure time which is less than the RTDT 66 from being used to schedule the transmission of the PDU corresponding to the RTDT 66. For example, if the RTDT 66 is equal to departure time 20, the status of departure times 9 through 19 will not be examined for availability. All departure times that are greater than or equal to the RTDT 66 (i.e., 20 through 40) will be examined for availability. Each of the departures times within the time domain 1 transmits an indication 116 of its availability to the combinatorial logic 140.

The combinatorial logic 145 uses the mask generated by the comparator 100 and the indication 117 of each departure time to identify as available, which of the identified departure times within time domain 0 is unused for scheduling within time domain 0. The combinatorial logic 145 selects the first identified departure time within time domain 0 which is less than or equal to the RTDT 66 and transmits it to the collector 150. For example, if the RTDT 66 were 5 and departure time 6 were unavailable, the first solution would be departure time 7.

The combinatorial logic 140 uses the mask generated by the comparator 105 and the indication 116 of each departure time to identify as available, the identified departure times within time domain 1 which are unreserved and unused for scheduling. The combinatorial logic 140 selects the first identified departure time within time domain 1 which is less than or equal to the RTDT 66 and transmits it to the collector 150. For example, if the RTDT 66 were 28 and departure time 32 is unavailable, departure time 36 represents the first solution to the request (i.e., departure times 29, 30, 31, 33, 34, and 35 are reserved).

The collector 150 uses the solutions from each of the time domains and the RMDT 67 to select the departure time identified as available from the earliest time domain identified as available and offer the selected departure time to the controller which requested the RTDT 66. If the departure time corresponding to the RTDT 66 is unreserved and unused, it is offered to the requesting controller and designated as used pending an acceptance by the controller. If the RTDT 66 is not available the collector 150 determines the best alternative. The collector 150 determines the best alternative available departure time by comparing all solutions returned by the individual time domains. The collector 150 will offer the departure time identified as available which is closest to the RTDT 66.

The VRS 62 uses the RMDT 67 when two or more controllers request the same RTDT 66. The VRS 62 offers the best departure time available to the controller with the earliest RMDT 67.

Referring now to FIGS. 4A and 4B, the overall operation of a system utilizing the present invention will now be described. The processing begins when data is received and placed in a queue (block 400). The controllers then transmit a RTDT 66 to the VSR 62 (block 405). The VSR 62 then determines the first solution for the requested departure time for each time domain held in VSR 62. Specifically, the VSR 62 determines whether the RTDT 66 falls within any of the ranges of each particular time domain (block 410). If the RTDT 66 falls within a particular time domain, the time domain is identified as available and a first solution for the particular domain is returned to the collector 150 and the departure time is designated as used pending acceptance by the controller (block 415). This process is performed for each time domain within the VSR 62 (block 420). The collector collects the first solution for each time domain and returns the lowest to the controller (block 430).

When multiple controllers request identical RTDTs 66 simultaneously, the collector will offer the BADT 63 to the controller with the earliest RMDT 67 (block 430). The controller then may accept or reject the offered departure time (block 435). If the offered time slot is accepted by the controller, an Accept BADT 61 is transmitted to the VSR 62 (block 440). The VSR 62 then schedules data for transmission during the accepted departure time (block 450). If the controller, however, chooses not to accept the BADT 61, the VSR 62 clears the departure times which were reserved pending acceptance. Processing then ends at step 455.

Figure 5:
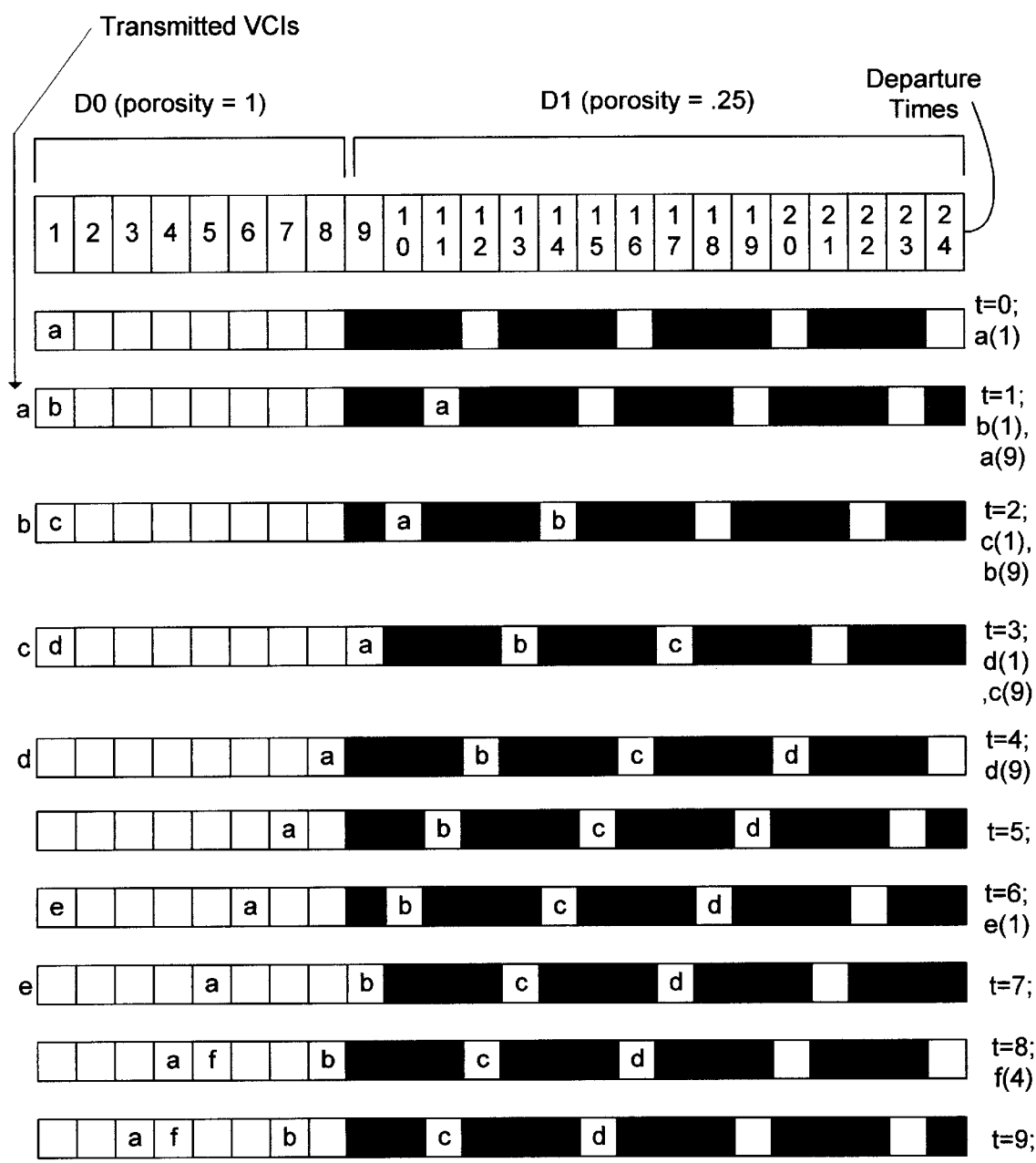
FIG. 5 is an example of the operation of a system utilizing the present invention.

Referring now to FIG. 5, an example of the operation of a system utilizing the present invention will now be described. FIG. 5 illustrates a series of timing intervals 1–24 for which data transmissions may be scheduled. Departure times 1–24 are further organized into two time domains: D0 and D1. Time domain D0 represents the near term departure times available for scheduling. Time domain D1 represents the long-term departures times available for scheduling. Time domain D0 is shown with a porosity of 1 (i.e., no departure times reserved). In other words, departure times 1–8 are all initially available for scheduling. Time domain D1, however, is shown with a porosity of 0.25. Consequently, only one-quarter of the departure times within time domain D1 are available and seventy-five percent of the departure times in time domain D1 are reserved (i.e., unavailable for scheduling).

FIG. 5 shows a progression of time over which a certain arrangement of departure times are requested and scheduled. At a time t0, a single schedule indication is received from VC A requesting an RTDT of 1. Because departure time 1 is presently available within the VRS 62 and not reserved by time domain D0, departure time 1 is assigned to virtual channel A. The advancement of time to t1 is transmitted to the VRS 62 by the Protocol Transmitter 64 when a PDU is transmitted. All subsequent time advancements are initiated by transmit indications from the Protocol Transmitter 64.

At time t=1, the VCI for VCA is shifted out of the VRS 62. During the same time interval, two schedule requests are received, one from VC A and another from VC B. VC A requests a departure time of 9. This request falls within time domain D1 which restricts scheduling for departure time 9. Time domain D1 determines the first solution to the request for departure time 9 to be departure time 11. VC B requests a departure time of 1. Departure time 1 is available and unrestricted by time domain D0. Consequently, VC B is assigned to departure time 1 and all departure times shift one departure time.

At time t=2, the VCI for VC B is shifted out of the VRS 62. During the same interval, new scheduling requests are received from VC B and VC C. VC B requests a departure time of 9 which is restricted by time domain D1. However, the first non-restricted location, departure time 10, is allocated to VC A. Time domain D1 resolves the conflict by allocating departure time 14 for VC B and all departure times shift one departure time.

At time t=3, the VCI for VC C is shifted out of the time domain 0 within. Time domain D1, however, does not shift. Two new scheduling indications are then received: VC D requests departure time 1 and VC C requests departure time 9. Departure time 1 in presently available because the VCI for VC A was shifted out of time domain 0 in the previous cycle. Consequently, departure time 1 is allocated to VC D. Departure time 9 is reserved within time domain 1. Normally, departure time 9 would be unreserved at the present time (i.e., t=3), however, departure time 9 is presently allocated to VC A. Likewise, departure time 13 would also be available at the present time, however, departure time 13 is allocated to VC B. Accordingly, the departure time 17 is offered as the first solution to the request for departure time 9 and all departure times shift one departure time.

At time t=4, the VCI for VC D is shifted out of time domain 0. During this period, time domain D1 shifts the VCI for VC A held in departure time 9 into time domain D0. A scheduling request for VC D at departure time 9 is received. Departure time 9, however, is reserved. Normally, the first solution to this conflict would be departure time 12. Departure time 12, however, is already allocated to VC B.

Similarly, the next solution, departure time 16, is also allocated. Consequently departure time 20 is the first solution and all departure times shift one departure time. At time t=5, no requests are received and all departure times are shifted one position within the VRS 62.

At time t=6, a request is received for VC E at departure time 1 which is presently available. Departure time 1 is allocated to VC E and all departure times shift one departure time. At time t=7, no requests are received and the VCI for VC E is shifted out of time domain 0 and all departure times shift one departure time.

At time t=8, a request is received for VC F at departure time 4 which is presently allocated to VC A. Consequently, the first solution, departure time 5 is allocated to VC F and all departure times shift one departure time. At time t=9, no requests are received and all departure times shift one departure time.

As time advances, all departure times are advanced until each VCI held within a departure time is shifted out of time domain 0 to the Protocol Transmitter 64.

Although the present invention described herein with respect to an ATM network, it should be understood that the present invention may be used to implement a system supporting multiple channels that have QoS requirements or various acceptable delays for the supported channels.

Methods for the determination of a theoretical departure time and other operations of the controllers as described herein are known to those of skill in the art. Furthermore, any number of different controller operations or theoretical departure time operations may be utilized with the teachings of the present invention. In fact, the present invention is particularly well suite for use with differing controllers and methods of determination of theoretical departure times.

Figure 6:
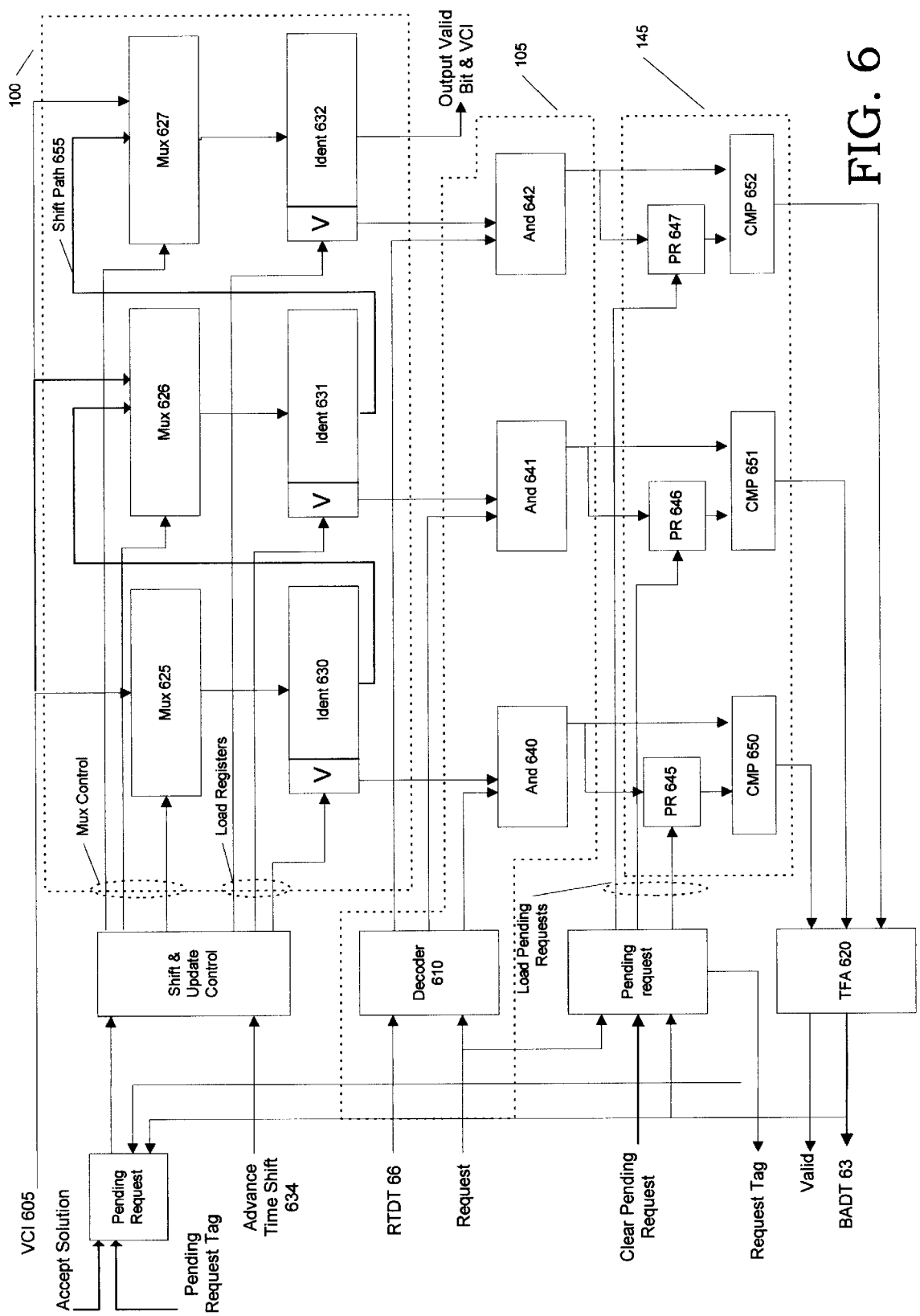
FIG. 6 is an example of a system utilizing the present invention.

FIG. 6 illustrates an exemplary system utilizing the present invention. The components shown in FIG. 6 are referred to using terms understood by those skilled in the art and may be analogized to the components and functions described herein. The combination of Muxes 625 through 627 and Registers 630 through 632 may form a schedule table 100, wherein the registers represent the cells. Advance Time Shift 634 may be used to shift the VCIs stored in the shift registers via shift path 655.

The Decoder 610 and And 640 may represent the comparator 100. The RTDT 66 may be transmitted to the Decoder 610 which generates a mask for determining which departure times within the particular time domain may be used to schedule the request. The mask may be transmitted to the Ands 640 through 632 to select which departure times may be available.

The PR 645 through 647 and CMP 650 through 652 may represent the combinatorial logic 145. Each selected departure time is checked for availability as compared to the status of the departure time. The results are forwarded to the Tester for First Availability (TFA) 620.

The TFA 620 may represent the collector 150. The TFA 620 examines each of the departure times identified as available and transmits the earliest departure time to the controller which made the request in the form of BADT 63.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of scheduling protocol data units for transmission on a virtual channel, the method comprising the steps of:

determining a relative theoretical departure time for a protocol data unit to be transmitted;

selecting a departure time from one of a series of immediate departure times in an immediate time domain for transmission of the protocol data unit if it is determined that the relative theoretical departure time is included in the immediate time domain and a protocol data unit has not been previously scheduled for transmission at the departure time;

determining if the relative theoretical departure time corresponds to a reserved departure time in a later time domain that follows the immediate time domain if the determined relative theoretical departure time is included in the later time domain, wherein the reserved departure time is reserved from scheduling;

selecting a departure time other than the reserved departure time from available departure times in the later time domain if it is determined that the relative theoretical departure time corresponds to a reserved departure time in the later time domain; and scheduling the protocol data unit for transmission during the selected departure time.

2. A method according to claim 1 further comprising the step of reserving departure times in the later time domain based upon a porosity associated with the later time domain.

3. A method according to claim 2, wherein said step of reserving departure times in the later time domain comprises the step of storing only unreserved departure times within the later time domain.

4. A method according to claim 3, wherein said step of storing comprises the step of storing only unreserved departure times within each time domain by storing context information for the virtual channels.

5. A method according to claim 1, further comprising the step of designating as used the selected departure time.

6. A method according to claim 1, wherein said step of determining comprises the step of identifying as available an unreserved and unused departure time closest in time to the corresponding relative theoretical departure time in the later time domain.

7. A method according to claim 1, wherein said step of selecting a departure time from one of a series of immediate departure times comprises the step of identifying as available an unused departure time closest in time to the corresponding relative theoretical departure time in the immediate time domain.

8. The method of claim 1, further comprising the step of requesting a departure time with a corresponding relative theoretical departure time, wherein the requests are made by a plurality of controllers each using a different control process.

9. The method of claim 1, wherein said step of determining a relative theoretical departure time for a protocol data unit comprises the step of determining a relative theoretical departure time for a protocol data unit, wherein the protocol data unit originates from one of a plurality of virtual channels each having similar priority.

10. A method according to claim 9, wherein said step of determining a relative theoretical departure time for a protocol data unit, wherein the protocol data unit originates from one of a plurality of virtual channels each having similar priority comprises the step of resolving substantially simultaneous requests for a common departure time from different controllers by providing a Relative Maximum Departure Time for each request which indicates the latest departure time allowed by each controller for the corresponding request.

11. A method according to claim 1, wherein the series of later departure times follows the series of immediate departure times in a time progression over which the immediate and later series of departure times are shifted towards a transmission time so that the later departure times transition to the immediate time domain whereupon unscheduled reserved departure times in the later time domain are made available for scheduling in the immediate time domain.

12. A method according to claim 1, wherein the series of later departure times follows the series of immediate departure times in a time progression over which the immediate and later series of departure times are shifted towards a transmission time so that the later departure times transition to the immediate time domain whereupon scheduled unreserved departure times in the later time domain are made unavailable for scheduling in the immediate time domain.

13. A system for scheduling protocol data units for transmission on a virtual channel, the method comprising:

means for determining a relative theoretical departure time for a protocol data unit to be transmitted;

means for selecting a departure time from one of a series of immediate departure times in an immediate time domain for transmission of the protocol data unit if it is determined that the relative theoretical departure time is included in the immediate time domain and a protocol data unit has not been previously scheduled for transmission at the departure time;

means for determining if the relative theoretical departure time corresponds to a reserved departure time in a later time domain that follows the immediate time domain if the relative theoretical departure time is included in the later time domain, wherein the reserved departure time is reserved from scheduling;

means for selecting a departure time other than the reserved departure time from available departure times in the later time domain if it is determined that the relative theoretical departure time corresponds to a reserved departure time in the later time domain; and means for scheduling the protocol data unit for transmission during the selected departure time.

14. The system of claim 13 further comprises means for reserving departure times in the later time domain based upon a porosity associated with the later time domain.

15. The system of claim 13, wherein said means for determining comprises means for identifying as available an unreserved and unused departure time closest in time to the corresponding relative theoretical departure time in the later time domain.

16. The system of claim 13, wherein said means for selecting a departure time from one of a series of immediate departure times comprises means for identifying as available an unused departure time closest in time to the corresponding relative theoretical departure time in the immediate time domain.

17. The system of claim 13, further comprising means for requesting a departure time with a corresponding relative theoretical departure time, wherein the requests are made by a plurality of controllers each using a different control process.

18. The system of claim 17, wherein said means for requesting a departure time comprises a means for providing a common interface between means for identifying, selecting and scheduling and the plurality of controllers.

19. The system of claim 13, wherein said means for determining a relative theoretical departure time for a protocol data unit comprises means for determining a relative theoretical departure time for a protocol data unit, wherein the protocol data unit originates from one of a plurality of virtual channels each having similar priority.

20. A system according to claim 13, wherein the series of later departure times follows the series of immediate departure times in a time progression over which the immediate and later series of departure times are shifted towards a transmission time so that the later departure times transition to the immediate time domain whereupon unscheduled reserved departure times in the later time domain are made available for scheduling in the immediate time domain.

21. A system according to claim 13, wherein the series of later departure times follows the series of immediate departure times in a time progression over which the immediate and later series of departure times are shifted towards a transmission time so that the later departure times transition to the immediate time domain whereupon scheduled unreserved departure times in the later time domain are made unavailable for scheduling in the immediate time domain.

22. A computer program product for scheduling protocol data units for transmission on a virtual channel comprising:

a computer-readable storage medium having computer-readable program code means embodied in said medium, said computer-readable program code means comprising:

computer readable program code means for determining a relative theoretical departure time for a protocol data unit to be transmitted;

computer readable program code means for selecting a departure time from one of a series of immediate departure times in an immediate time domain for transmission of the protocol data unit if it is determined that the relative theoretical departure time is included in the immediate time domain and a protocol data unit has not been previously scheduled for transmission at the departure time;

computer readable program code means for determining if the relative theoretical departure time corresponds to a reserved departure time in a later time domain that follows the immediate time domain if the determined relative theoretical departure time is included in the later time domain, wherein the reserved departure time is reserved from scheduling;

computer readable program code means for selecting a departure time other than the reserved departure time from available departure times in the later time domain if it is determined that the relative theoretical departure time corresponds to a reserved departure time in the later time domain; and computer readable program code means for scheduling the protocol data unit for transmission during the selected departure time.

23. The computer program product according to claim 22, further comprises computer readable program means for reserving departure times in the later time domain based upon a porosity associated with the later time domain.

24. The computer program product according to claim 22, wherein said computer readable program means for determining comprises computer readable program means for identifying as available an unreserved and unused departure time closest in time to the corresponding relative theoretical departure time in the later time domain.

25. The computer program product according to claim 22, wherein said computer readable program means for selecting a departure time from one of a series of immediate departure times comprises computer readable program means for identifying as available an unused departure time closest in time to the corresponding relative theoretical departure time in the immediate time domain.

26. The computer program product according to claim 22, further comprising computer readable program means for requesting a departure time with a corresponding relative theoretical departure time, wherein the requests are made by a plurality of controllers each using a different control process.

27. The computer program product according to claim 22, wherein said computer readable program means for determining a relative theoretical departure time for a protocol data unit comprises computer readable program means for determining a relative theoretical departure time for a protocol data unit, wherein the protocol data unit originates from one of a plurality of virtual channels each having similar priority.

28. A computer program product according to claim 22, wherein the series of later departure times follows the series of immediate departure times in a time progression over which the immediate and later series of departure times are shifted towards a transmission time so that the later departure times transition to the immediate time domain whereupon unscheduled reserved departure times in the later time domain are made available for scheduling in the immediate time domain.

29. A computer program product according to claim 22, wherein the series of later departure times follows the series of immediate departure times in a time progression over which the immediate and later series of departure times are shifted towards a transmission time so that the later departure times transition to the immediate time domain whereupon scheduled unreserved departure times in the later time domain are made unavailable for scheduling in the immediate time domain.

* * * * *